Nov. 3, 1942.　　　W. H. McALLISTER　　　2,300,795
DISTRESS BUOY AND THE LIKE
Filed July 9, 1941　　　2 Sheets-Sheet 1
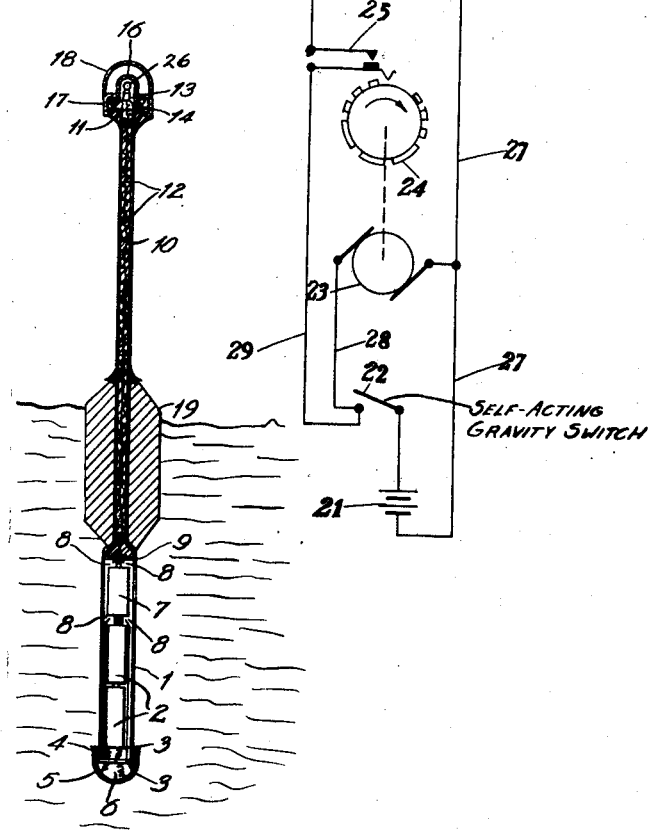
INVENTOR
W. H. McAllister
BY
ATTORNEY

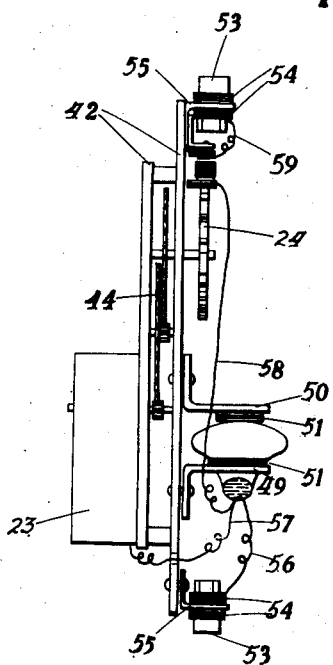
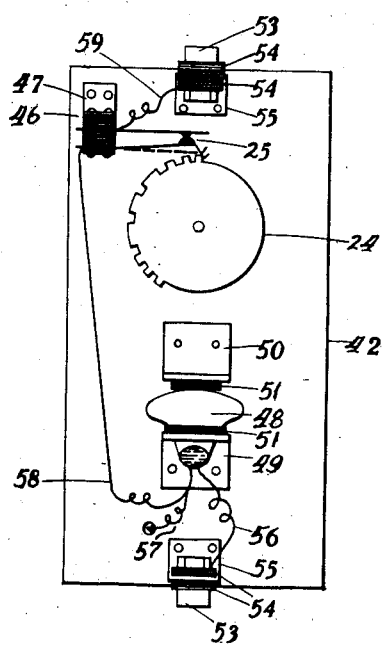
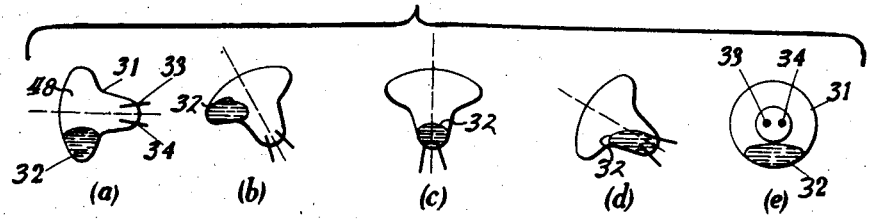

Patented Nov. 3, 1942

2,300,795

UNITED STATES PATENT OFFICE 2,300,795

DISTRESS BUOY AND THE LIKE

William Hugh McAllister, London, England, assignor to International Marine Radio Company Limited, London, England Application July 9, 1941, Serial No. 401,576
In Great Britain March 1, 1940

4 Claims. (Cl. 177—329)

This invention relates to electrically illuminated and controlled floating light-buoys for use in the sea, rivers or lakes, as a means of indicating position. In particular, it is intended for use as a distress-buoy for life-saving purposes; or as a marker-buoy for the location of anchorages, or fishing nets, or other objects either floating or anchored.

The principal object of the invention is to provide an electrically illuminated buoy emitting a characteristic flashing light-signal for any of the following purposes:

(a) Attached to life-rafts, lifebuoys, etc. such as those carried on board ship for life-saving use, for the purpose of guiding persons in the water towards such life-saving apparatus.

(b) Attached to life-rafts, etc. as in (a) above for the purpose of attracting the attention of ships or aircraft and guiding such craft towards those in distress.

(c) Attached to floating objects such as fishing nets or harpooned whales, which may be left temporarily unattended, for the purpose of identifying such objects and guiding back those concerned.

(d) For marking and identifying anchorages in rivers, harbours or lakes.

Means may also be provided whereby such apparatus becomes automatically operative only on assuming its normal upright floating position; this is especially important in the case of the distress buoy as in (a) above.

According to the invention, a floating light-buoy comprises an electric lamp, an electric motor for operating a contact device adapted to close intermittently a circuit for the lamp, an electric battery for driving the motor and lighting the lamp and automatically or manually operated switch for closing the circuit of the motor and, if desired, for preparing the circuit for the lamp when the buoy is thrown or placed in the water.

Generally speaking, the apparatus in its preferred form comprises:

(1) An electric lamp supported at a suitable height above the water to give good visibility.

(2) An electric battery for illumination of the lamp and for supplying power to (3) below.

(3) An electrically-operated device for causing the lamp to be switched on and off automatically and continuously, for either or both of the following reasons:

(a) Periodical emission of a characteristic signal comprising flashes of predetermined duration and combination, such as, for example, the dots and dashes of letters of the Morse code, for identification purposes.

(b) Economy in consumption of electric current from the battery, by periodically switching on and off the current to the lamp so that the latter is illuminated for only short periods with relatively long intervals of non-illumination between.

(4) Means for automatically causing the device to become operative when it assumes a more or less upright position in the water, the non-operating position being either more or less horizontal, or inverted.

(5) Watertight housing for the above apparatus.

In the accompanying drawings, Fig. 1 is a schematic diagram of the circuit of a device according to the invention, Fig. 2 illustrates a constructional embodiment, Fig. 3 is a sectional view of the buoy shown in Fig. 2, Figs. 4 and 4A show side and front elevations of the contact-operating mechanism, and Fig. 5 illustrates a suitable form of gravity switch of the mercury type.

Referring first to Fig. 1, 21 is an electric battery supplying power to operate the device. Switch 22 is of the self-acting gravity-operated type, so arranged that when the buoy assumes an upright floating position in the water, the electrical circuit between the battery and the rest of the apparatus is completed, while with the buoy lying at an angle substantially different from this vertical position (for example, 60° would be a suitable angle), the circuit would be broken and the apparatus would not function; this switch 22 could for example, be of the well known mercury type of switch suitably constructed to function as described above.

When switch 22 completes the circuit, current from the battery is supplied to a small electric motor 23 of conventional design, through the circuit 21, 22, 28, 23, 27, 21. The motor 23 is mechanically coupled through suitable step-down gearing to cam-plate 24 causing the latter to rotate at slow speed.

A spring-switch 25 is fixed in position in relation to the cam so that, as the cam rotates, projections around the edge of the cam will engage one of the springs of switch 25 causing this switch to close and the current to flow from the battery to the electric lamp 26 through the circuit 21, 22, 29, 25, 30, 26, 27, 21. By suitably arranging the projections around the edge of the cam, the switch 25 may be caused to close and open in any desired sequence of operations, so that the lamp will be lit and extinguished correspondingly, thus emitting a characteristic flashing light-signal. For example, in the diagram, the cam-plate shown is designed so that as it rotates (indicated by the arrow), the switch will be operated in such manner that the lamp will emit three short flashes, followed by three longer flashes, then by three short flashes—that is, the so-called "S O S" signal of distress. This signal will be repeated once for each revolution of the cam. Similarly, any desired combination of flashes forming a characteristic signal can be provided by suitably arranging the cam projections.

Alternatively, the flashes could be arranged to be of relatively very short duration in relation to the total time of operation of the device, by suitably arranging the cam, so as to economise current consumption from the battery.

Switch 25 is shown in the diagram as a double-spring switch, but a similar control could be equally provided by having a single spring forming one side of the switch, while the cam-plate itself could form the other side, completing the electrical circuit by contact between the spring and the cam-plate.

Thus, if Fig. 1 be imagined laid upon its side, or upside down, switch 22 will be opened by gravity and the apparatus will not function. If now the apparatus be moved into the vertical position, switch 22 will close, motor 23 will commence to drive cam 24 at slow speed, and the lamp will commence to emit the characteristic signal required. By suitably designing the apparatus so that it will normally float in water in a vertical position, this object will be achieved.

If desired, a manually operated switch may also be used in circuit between battery 21 and switch 22, but this is not essential since the device would normally be kept in the non-operating state by being stowed horizontally when not in use.

Alternatively to the gravity operated switch mentioned above, a spring-controlled switch with water-tight plunger could be arranged so that when the buoy is required for use and is lowered into the water, a releasing-pin is extracted and the electrical circuit closed by the spring-controlled switch. For example, the releasing-pin could be tethered to the rail of a ship so that when the buoy is thrown overboard the pin is withdrawn and the buoy mechanism commences to work.

Fig. 2 illustrates a typical buoy operating on the above principle, while Fig. 3 is a sectional view of the same apparatus. This particular form is described as follows:

1 is a watertight cylindrical container of metal, inside which are placed the electric battery 2 and control apparatus 7. The battery 2 comprising one or more cells should preferably be contained inside a further watertight container 3, the base of which would be metal and would be flanged; the purpose of this inner container will be described later. Electrical contact between the metal base of this inner container and one pole of the battery, which pole for example in the case of a dry battery, would be the zinc case, is maintained by means of spring 4. A cap 5 screwed on to the base of cylinder 1 seals the lower end as effectively as possible and permits access for replacement of battery, etc. Spring 6 pressing against the metal base of container 3 forces the flange of 3 into electrical contact with the cylinder 1 which is used as one conductor of the electrical circuit.

The control apparatus (represented in Fig. 1 by 22, 23, 24 and 25) can be mounted for convenience and security inside a container 7 (Fig. 3) which also is cylindrical and arranged to slide into container 1 so that it can readily be withdrawn for inspection and replacement. Electrical connection between the second pole of battery 2, through the apparatus inside container 7 to the lamp 26 is made through contacts 8 which are pressed together through the action of springs 4 and 6, and thence through insulated conductor 11. The container 7 housing the control apparatus, instead of being a separate removable unit, may be permanently secured at the top of the tube 1 or it may be screwed into the top of the watertight container 3. The return circuits from the apparatus inside container 7 and from the lamp 15 are made through container 1 and metal tube 10, which tube is rigidly fixed to container 1 for example by welding so as to maintain watertightness and electrical continuity.

The top of the container 1 is effectively sealed by an insulating disc 9 and suitable waterproof compound. The purpose of this is two-fold: firstly, the disc acts as an insulating support for the topmost contact 8; secondly, should by chance water leak into the main container 1, the top of this container being airtight will prevent escape of air, and the air pressure inside will rise until further ingress of water is prevented by equilibrium of pressure within and without the container. The main purpose of the inner watertight battery container 3 will now become apparent; since only a limited quantity of water can enter the main container 1 it cannot rise above the top of the inner battery container 3, and hence will not cause the device to become inoperative through battery leakage.

Tube 10, which as previously stated is rigidly fixed to the top of container 1 in a watertight manner, supports at its upper end the lamp assembly. Conductor 11 is preferably surrounded by a light packing material 12 so as to prevent chafing of the insulation of 11 by contact with tube 10.

The lamp assembly comprises the following: an electric lamp socket 13 is carried on spring 14 which serves both to provide mechanical protection to the lamp and also as an electrical connection between one pole of the lamp and the return circuit to the battery composed of the metal tube 10 and container 1. Conductor 11 connects to the other pole of the lamp socket. A protective glass cover 16 is clamped over the lamp assembly by means of a screw-cap 17. suitable packing material being used to complete water-tightness of the whole assembly. A wire guard 18 may be provided for protection of glass cover 16.

A float 19 of cork or other suitable buoyant material is fixed around the tube 10 so that it will cause the buoy to float on the surface of the water. It will be noted that the main container 1 and apparatus inside it also acts as counterweight to keep the buoy floating in an upright position, so that the light is well above the surface of the water, to give visibility over an appreciable distance from the buoy.

Figs. 4 and 4A show one possible arrangement of the apparatus inside container 7, the container itself being here omitted for the sake of clarity. Fig. 4 is a side elevation and Fig. 4A a front elevation showing the cam and switching arrangements. The electric motor 23 mounted on base-plates 42 drives the cam plate 24 through suitable reduction gearing 44. The cam plate 24, which as in the case in Fig. 1 is here shown arranged to cause the lamp to transmit the so-called "S O S" distress signal, is shown operating and closing switch 25, the normal (open) position of which is indicated by a dotted line. Switch 25 is mounted by insulating material 46 and bracket 47 on baseplate 42 or by other suitable means.

A gravity switch 48, here shown as a mercury switch of orthodox type but suitably shaped for functions as described below, is mounted on baseplate 42 by means of brackets 49 and 50, and anti-shock padding 51, or by other suitable means.

Contacts 53 mounted on but insulated from baseplate 42 by insulating pieces 54 and bracket 55, or by other suitable means, form the two connections to the battery and lamp respectively. These contacts correspond to the contacts 8 at either end of container 7 in Fig. 3.

Conductor 56 serves to convey current from the lower terminal 53 to the gravity switch 48; the other side of the gravity switch is connected through conductor 57 to the electric motor 23, and through conductors 58 and 59 to the upper contact 53 and thence to the lamp.

Fig. 5 illustrates generally the action of a typical gravity switch of the mercury type to perform the function desired. In Fig. 5, (a) which is a side view, 31 is a glass container suitably shaped, inside which is a small amount of mercury 32; two contacts 33 and 34 are sealed through the glass of the bottom of the container so as to provide an electrical circuit through the glass; in plan view, the container is circular as in Fig. 5, (e).

The action of such a gravity switch is shown in Fig. 5, (a) to (d) inclusive. In Fig. 5, the switch is shown at (a) on its side so that the mercury does not bridge the contacts 33 and 34. By suitably designing the glass container, it can be arranged so that the mercury does not flow out of this part of the container until the latter has been tilted to an angle approaching the vertical as shown at (b) and (c). Also, the container being suitably designed, the mercury will not commence to flow back into the upper portion of the container until it has been brought back nearly to a horizontal position as shown at (d).

The gravity switch would be mounted inside the buoy in such manner that when the buoy is not required to function and is stowed in a horizontal position, the switch would be in the position shown in (a) of Fig. 5; while with the buoy in action in a vertical position, the switch position would be as shown in (c). The special construction of the glass container described in the previous paragraph would, however, provide safeguards so that, for example, if the buoy were stowed in a nominally horizontal position aboard ship it would not be set in action by rolling or pitching of the ship; while on the other hand, if the buoy is floating in the water, unsteady rocking movements due to waves would not cause the apparatus to cease functioning intermittently.

It only remains to add that the buoy would normally have a short length of rope or lanyard attached for tethering it to the object or place to be identified—e. g. life-raft, fishing net or anchorage.

What is claimed is:

1. A light buoy for distress signals and the like comprising a tubular conductive member relatively long in respect to its diameter, having a light bulb disposed at one end, a float comprising a cylinder of buoyant material coaxially formed on the surface of said member at a predetermined distance from said bulb so that the latter may be held a sufficient distance above the surface of the water to insure adequate visibility, an enlarged tubular conductive chamber integral with said tubular member and formed coaxially therewith depending below said cylinder, a threaded cap closing the bottom of said cylinder, a conductive casing containing a plurality of coaxially disposed battery cells each provided with axially disposed terminals at each end disposed within said cylinder the lower terminal being in contacting relation with said casing, a second casing closely fitting the bore of said chamber removably disposed therein above said battery, a contact on the bottom said second casing engaging an axially disposed contact of said battery, a second contact axially disposed on the top of said second casing, a contact member axially disposed in said tubular member but insulated therefrom positioned to be engaged by the contact on the top of second casing when said casing is in place, a circuit extending upward through said tubular member connecting said last named contact member with one terminal of said light bulb the other terminal of said bulb being connected to said tubular member, light flashing means in the second casing for interrupting the circuit from said battery to said bulb and a gravity operated battery switch in circuit with said battery and light flashing means for disconnecting said battery from said means when the buoy is in other than floating position.

2. A light buoy according to claim 1 having spring means disposed between said battery and said threaded cap effective to hold the contacts of the second casing in engagement with adjacent contact.

3. A light buoy according to claim 1 in which said gravity operated battery switch is contained within the tubular member.

4. A light buoy according to claim 1 in which said gravity operated battery switch is disposed within the casing containing the light flashing means whereby said switch is removed from said chamber with said casing.

WILLIAM HUGH McALLISTER.